(No Model.)
F. WILHÖFT.
HEATING AND COOLING COIL AND PROCESS OF PRODUCING THE SAME.
No. 311,552. Patented Feb. 3, 1885.
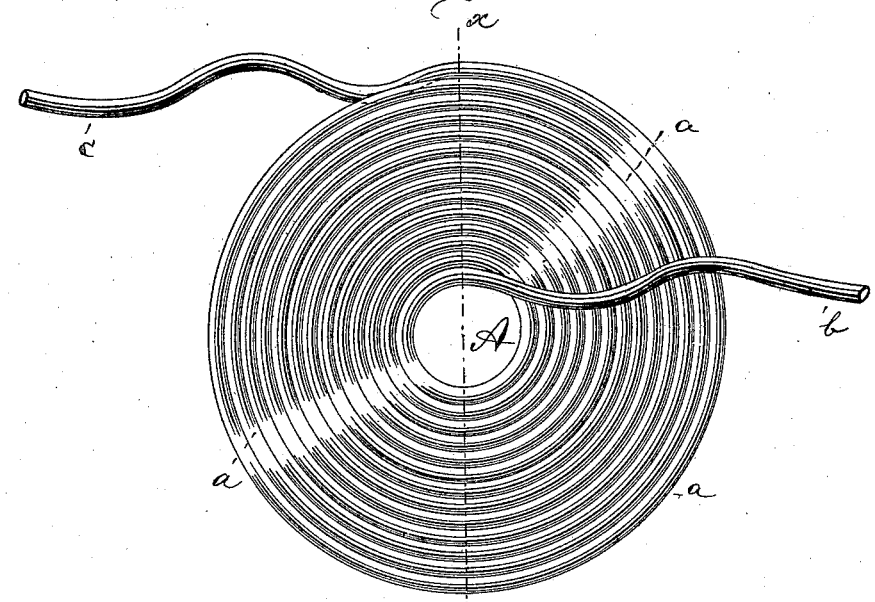
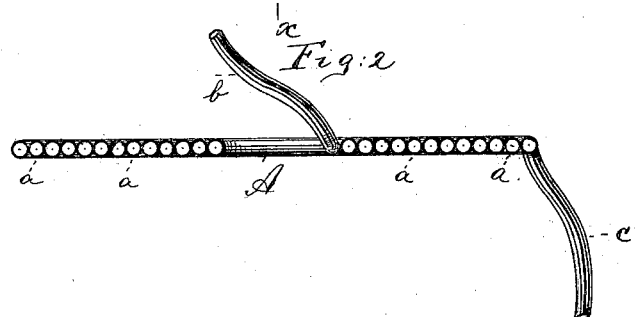
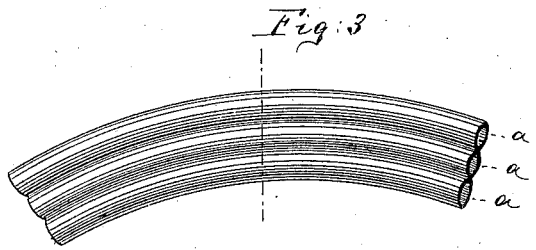 
WITNESSES
Wm. A. Lowe
Robt H. Roy
INVENTOR
Franz Wilhöft
by Frank v. Briesen
attorney

UNITED STATES PATENT OFFICE.

FRANZ WILHÖFT, OF NEW YORK, N. Y.

HEATING AND COOLING COIL AND PROCESS OF PRODUCING THE SAME.

SPECIFICATION forming part of Letters Patent No. 311,552, dated February 3, 1885.

Application filed November 29, 1884. (No model.)

*To all whom it may concern:*

Be it known that I, FRANZ WILHÖFT, of the city of New York, in the county and State of New York, have invented a new and Improved Heating and Cooling Coil and Process of Producing the Same, of which the following specification is a full, clear, and exact description.

This invention has for its object to produce a rubber coil for medical purposes without any cement or binding material between the convolutions of rubber tubing. By my invention I am enabled to produce a coil of increased strength, and one which will distribute the heat or cold more evenly to the patient than one where the convolutions are connected by intermediate binding materials.

The invention consists in the process of joining the rubber convolutions directly to one another, in a manner hereinafter more fully pointed out, and also in the coil produced by said process.

In the accompanying drawings, Figure 1 is a face view of a coil embodying my improvement. Fig. 2 is a transverse section on the line *x x*, Fig. 1; Fig. 3, a detail perspective view of portion of the coil, and Fig. 4 a transverse section through Fig. 3.

In carrying out my invention I proceed as follows: An unvulcanized rubber tubing is obtained from a tubing-machine of suitable construction. This tube as it is run out, and while still warm, is placed in the form of a spiral upon a horizontal table.

To facilitate the formation of the spiral I employ a table which revolves around a center, and a workman guides the tubing by hand as the table is revolved so as to form the several convolutions constituting the coil. In guiding the tubing a slight pressure by hand is exerted toward the convolutions already formed, and as the rubber is not vulcanized, and still warm, this will cause a slight adhesion of the several convolutions and the formation of a continuous coil. When the coil has reached the size required, the end of the tubing is left ununited, and thus forms one of the inlet or discharge pipes. The coil prepared as above is next placed in the vulcanizer, and there subjected to heat. The heat will cause an expansion of the convolutions, and as these are already slightly connected they will not be displaced, but be crowded tightly against one another. In this way the contact-surface between every pair of convolutions is flattened or enlarged; or, in other words, each pair of adjacent convolutions will have part of the tubing in common.

The drawings represent at A the finished coil. The same is composed of convolutions *a*, connected in the manner described, and terminating in the inlet and discharge tubes *b c*.

A coil formed by my process will be found of superior utility. I have ascertained that it causes a very even distribution of heat or cold to that part of the human body over which it is applied, and as this is of the greatest importance results may be obtained much more satisfactory than in coils which employ a binding medium to connect the convolutions. As by my process the convolutions or water-channels are brought nearer together, I am enabled to produce a greater heating or cooling surface than in coils in which each convolution is distinct and separate from the adjoining convolutions.

I claim as my invention—

1. The process of forming a coil which consists in winding an unvulcanized warm rubber tubing upon itself to constitute a spiral, pressing the convolutions together to cause adhesion, and then vulcanizing the completed coil, substantially as and for the purpose specified.

2. As a new article of manufacture, a coil, A, composed of rubber convolutions *a*, wound in a spiral and connected without an intermediate binding material in such a way that the adjoining convolutions are blended into one another at their junction, substantially as specified.

F. WILHÖFT.

Witnesses:
   F. V. BRIESEN,
   R. H. ROY.